Patented Aug. 14, 1928.

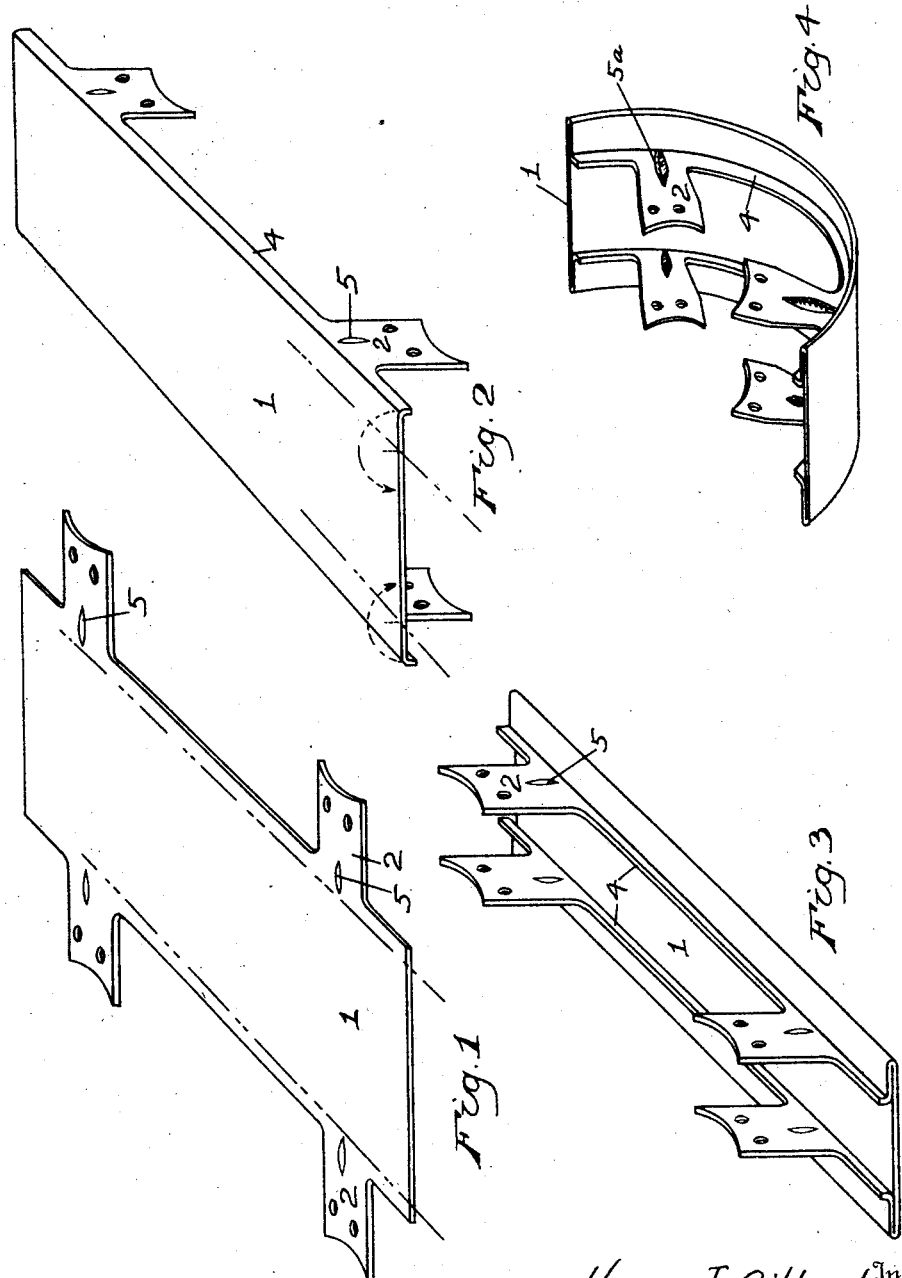

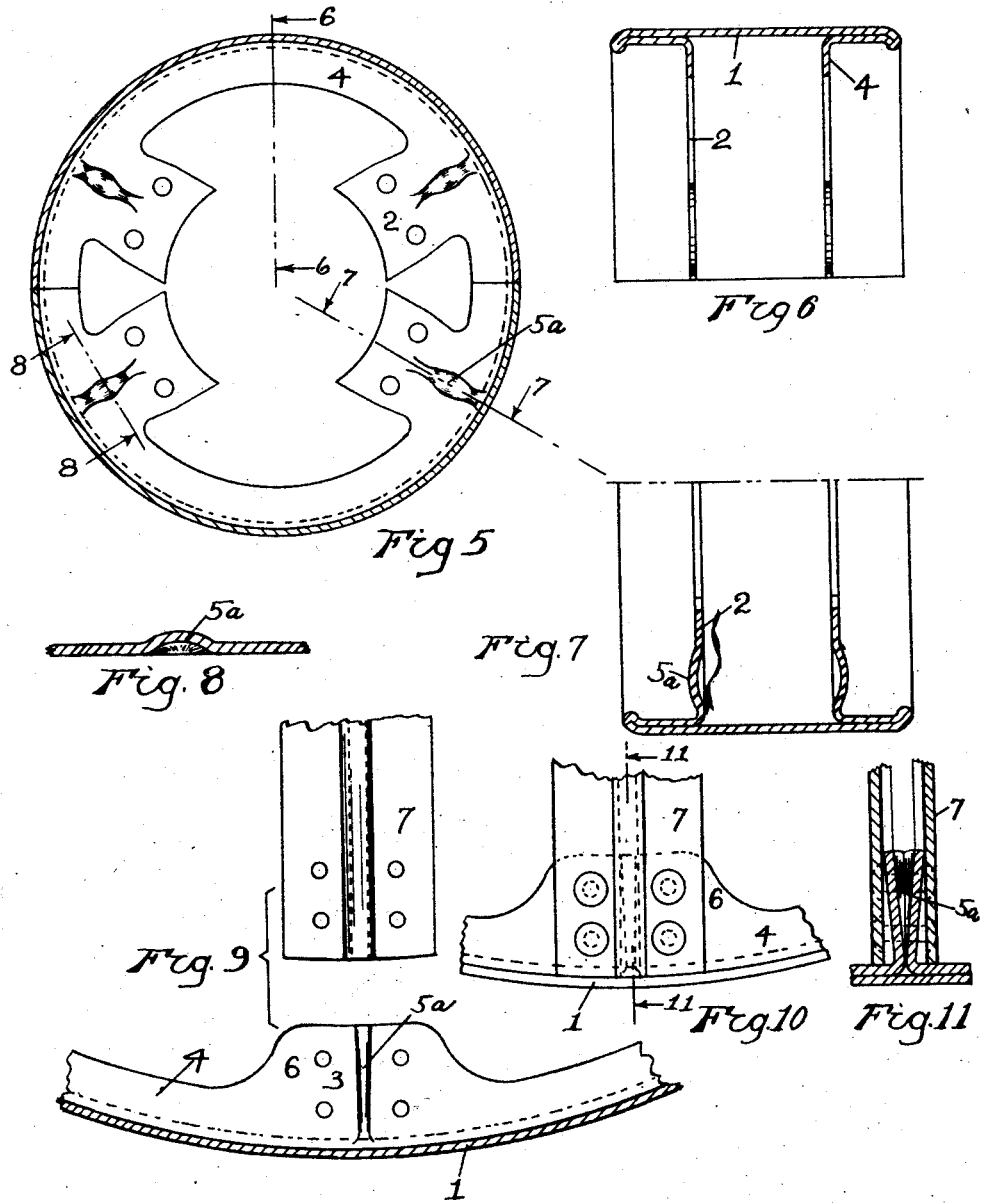

1,680,985

UNITED STATES PATENT OFFICE.

HENRY J. GILBERT, OF SAGINAW, MICHIGAN, ASSIGNOR TO SAGINAW MANUFACTURING CO., OF SAGINAW, MICHIGAN, A CORPORATION OF MICHIGAN.

METHOD OF MAKING SHEET-METAL PULLEYS.

Application filed July 26, 1924. Serial No. 728,467.

This invention relates to a new method of manufacturing belt pulleys and the like from sheet metal.

By this method cost of production is reduced, strength of the finished pulley is increased without increasing the amount of material employed, and unusual stiffness of the spokes and rim is secured, enabling the pulley to resist greater stresses caused by belt pressure, greater torsion produced by belt pull, and more centrifugal force. Consequently pulleys made by this method will transmit heavier loads, and can be safely run at higher speeds. By my method of manufacture not alone the rim but also the spokes of a small diameter pulley may be formed integral from a single piece of sheet metal. In pulleys of larger diameter the rim together with spoke stubs that are of sufficient length to permit independent spokes to be riveted or otherwise fastened to them are made integral from a single piece of sheet metal.

In either case, namely, in the manufacture of small diameter pulleys with integral spokes, or of larger diameter pulleys with integral spoke stubs, my method produces a pulley having a maximum of flange reinforcement around the inside of the pulley rim for a minimum of material used.

Usually pulleys have been made by first cutting from sheet metal a rim blank of sufficient length to make half of a pulley rim, and then folding the edges of the blank and finally forming the rim into semi-circular shape by pressing or rolling. An annular reinforcing flange has been formed on the interior of the rim, to which independent spokes can be secured by riveting or otherwise.

So far as I am aware, sheet metal pulleys in which the spokes are formed integral with the rim of the pulley have not been made heretofore. My method accomplishes this result and also certain others that will appear later in the specification.

In the accompanying drawings I have shown various steps of my method as applied to the manufacture of a sheet metal pulley having a rim and spokes integral, as in small diameter pulleys. I then show the same method as applied to a pulley of larger diameter whereby the rim and its reinforcing flange, together with inwardly extending spoke-stubs are all formed integrally. The integral spoke-stubs in the latter construction are made by the same method as are the integral spokes for the smaller diameter pulleys.

In the drawings Fig. 1 is a view of the flat sheet metal blank for the combined rim and spoke as applied to small diameter pulleys.

Fig. 2 is a perspective view of the same blank with its edges flanged.

Fig. 3 is a view of the flanged blank of Fig. 2 after being folded as indicated by dotted lines.

Fig. 4 is a perspective of the part shown in Fig. 3 after being rolled into the shape of a half pulley.

Fig. 5 is a sectional view of two halves assembled.

Fig. 6 is a section on the line 6—6 of Fig. 5.

Fig. 7 is a section on line 7—7 of Fig. 5.

Fig. 8 is an enlarged section on line 8—8 of Fig. 5.

Fig. 9 illustrates an independent spoke and a spoke stub of a large diameter pulley made in accordance with my method.

Fig. 10 shows the parts of Fig. 9 assembled.

Fig. 11 is a longitudinal section on line 11—11 of Fig. 10.

In carrying out my method I first make a rim blank 1 of sheet metal as is usual, but on the edges of the blank I form either the spoke blanks 2 for small pulleys, as shown in Figs. 1 to 5, or the spoke stubs 6 for large diameter pulleys, as shown in Figs. 9, 10, 11.

The blank is bent at right angle along its edges as indicated by dotted lines in Fig. 2, the edges forming flanges, and it is then folded into the position shown in Fig. 3. The formed blank of Fig. 3 is then rolled into semi-circular shape, as shown in Fig. 4. Obviously if the stiffening flange 4 had considerable radial depth, the pulley being of small diameter, the inner edge of the flange 4 would be crinkled, since it was originally of the same length as the rim, but is now formed to a smaller circumference. Crinkling or distortion of the rib or flange 4 constitute visible evidence of internal strains in the rim, and indicate structural weakness in the completed pulley, a serious but common disadvantage in pulleys of this type as heretofore manufactured.

My method turns this former disadvantage into a structural advantage. I accomplish this result by bumping up or otherwise forming an offset 5 in the blank at the juncture of the spoke with the body of the blank, as shown in Fig. 1. A function of this offset 5 is to absorb the surplus metal which would otherwise form crinkles at the juncture of the spoke 2 and flange 4 when the rim is rolled or pressed to semi-circular form. The rim-forming operation then simply increases the size and length of the offset 5 and thereby produces a raised boss 5ª. The boss 5ª may be used as a reinforcing ridge for the spoke member. It also relieves flange 4 of compressive strains which would otherwise tend to produce crinkles.

The boss 5ª is illustrated in Fig. 5 and in the enlarged cross section in Fig. 8.

If the pulley is of such large diameter that it is not practicable to make the spokes integral with the flange 4 I form a spoke stub 6, Figs. 9 and 11, instead of a spoke. The stub 6 is reinforced by the raised boss or offset 5 in the same manner as the spokes of Fig. 4, but in the construction of Fig. 9 an independent spoke 7 is riveted to the spoke 6.

When the stub 6 and independent spokes 7 are used as above described they may be assembled and riveted as shown in Figs. 10 and 11. It is to be understood, however, that the specific constructions which I have illustrated are merely examples that show the manner of carrying out my improved method of making sheet metal pulleys. The novel feature of the pulley itself as a mechanical unit is described and claimed in my co-pending application Serial No. 727,285, filed July 21, 1924.

By the method above described I am enabled to produce from a single rim-blank not only the usual integral rim tread and its reinforcing flange, but also integral spokes for small diameter pulleys or spoke-stubs for larger pulleys, as the case may be. I also avoid appreciable crinkling of the reinforcing flange while availing myself of the tendency to crinkle to automatically produce at the juncture of the flange and the spoke, a raised strip or reinforcing ridge.

Having thus described my invention, what I claim and desire to secure by Letters Patent is:

1. The method of making a rim section of a sheet metal pulley that consists in forming a blank including a rim section and oppositely directed flat spoke members integral therewith, forming raised bosses in the blank at the juncture of the spoke members and the body of the blank, folding the longitudinal edges of said blank to form a rim portion of double thickness, bending the spoke members thereon at right angles to said rim blank and then rolling the folded blank into semi-circular form, thereby causing said raised boss to take up metal of the blank and producing a flat spoke member free of crinkles.

2. The method of making a rim section of a sheet metal pulley from a single piece of sheet metal that consists in forming a single blank including a rim member and flat spoke members, forming a raised boss in said blank at the juncture of each spoke member with the body of the blank, folding the lateral edges of said blank to form a rim portion of double thickness, bending a part of said edge and the spoke members thereon at right angles to said rim blank, and forming the folded blank into semi-circular shape, thereby causing said bosses to become reinforcing ridges for said flat spoke members.

In testimony whereof, I affix my signature.

HENRY J. GILBERT.